United States Patent
Hosein

(10) Patent No.: US 6,728,272 B1
(45) Date of Patent: Apr. 27, 2004

(54) METHOD AND APPARATUS FOR TRANSPORTING PRIVATE LINE TRAFFIC OVER AN ATM NETWORK

(75) Inventor: Patrick A. Hosein, Monmouth, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/268,703

(22) Filed: Mar. 16, 1999

Related U.S. Application Data

(60) Provisional application No. 60/114,394, filed on Dec. 30, 1998.

(51) Int. Cl.$^7$ .................................................. H04J 3/02
(52) U.S. Cl. ................ 370/539; 370/395.6; 370/395.64
(58) Field of Search ................................ 370/352–354, 370/355, 356, 357, 359, 395.6, 395.64, 421, 422, 442, 459, 465, 466, 468, 474, 498, 532, 535, 536–542, 229, 232, 419, 420, 463, 248, 395.2, 395.1, 394, 410, 471, 479

(56) References Cited

U.S. PATENT DOCUMENTS

| | | | |
|---|---|---|---|
| 5,463,620 A | | 10/1995 | Sriram |
| 5,619,500 A | | 4/1997 | Hiekali |
| 5,805,577 A | * | 9/1998 | Jain et al. .................... 370/234 |
| 5,831,970 A | | 11/1998 | Arao |
| 5,835,484 A | | 11/1998 | Yamato et al. |
| 5,889,773 A | * | 3/1999 | Stevenson, III ............. 370/352 |
| 5,909,443 A | | 6/1999 | Fichou et al. |
| 5,946,323 A | * | 8/1999 | Eakins et al. ............... 370/468 |
| 5,953,338 A | | 9/1999 | Ma et al. |
| 5,982,748 A | | 11/1999 | Yin et al. |
| 5,982,767 A | | 11/1999 | McIntosh |
| 6,028,840 A | * | 2/2000 | Worster ....................... 370/230 |
| 6,038,231 A | * | 3/2000 | Dolby et al. ................ 370/394 |

(List continued on next page.)

OTHER PUBLICATIONS

Jeong, Seong–Ho et al "Cell Loss Ratio and Multiplexing Gain of an ATM Multiplexer for VBR Sources" Local Computer Networks, Oct. 11–14, 1998, pp. 384–389.

Babu, T.V.J.G. et al "Performance of a Priority–Based Dynamic Capacity Allocation Scheme for WATM Systems" Global Telecommunications Conference, Nov. 8–12, 1998, vol. 4, pp. 2234–2238.

Wang, Wendong et al "Implementation of an ATM Network and PSTN/N–ISDN Interworking Gateway" Communication Technology Proceedings, Oct. 22–24, 1998, vol. 1, pp. 45–49.

K. Sriram and Y.–T. Wang, "Voice Over ATM Using AAL2 and Bit Dropping: Performance and Call Admission Control," 1998 IEEE ATM Workshop (May 1998).

Kotikalapudi Sriram, R. Scott McKinney and Mostafa Hashem Serif, "Voice Packetization and Compression in Broadband ATM Networks," IEEE Journal on Selected Areas in Communications, vol. 9, No. 3, pp. 294304 (Apr. 1991).

(List continued on next page.)

*Primary Examiner*—Phirin Sam

(57) ABSTRACT

A method and apparatus are provided to transport private line traffic over an ATM network. A first plurality of TDM private line traffic links, such as T1 or E1 circuits, are multiplexed to create a first rt-VBR virtual circuit such that the bandwidth of the first rt-VBR virtual circuit is not limited. A second plurality of TDM private line circuits are multiplexed to create a second rt-VBR virtual circuit such that the bandwidth of the second rt-VBR virtual circuit is not limited. This may be done by AAL2 multiplexing with substantially large SCR, PCR and MBS values and the removal of T1 frames that do not contain data (that is, frames that contain only frame delimiters). The first and second rt-VBR virtual circuits are combined for transport over a link in the ATM network. An overload control process may be performed based on the ATM network link utilization.

5 Claims, 2 Drawing Sheets

OTHER PUBLICATIONS

J.L. Marzo, J. Domingo–Pascual, R. Fabregat and J. Solé–Pareta, "Enhanced Convolution Approach for Connection Admission Control in ATM Networks," pp. 165–181.

Silvia Giordano, Jean–Yves Le Boudec, Philippe Oechslin and Stephan Robert, "VBR Over VBR: The Homogeneous, Loss–Free Case,".

John H. Baldwin, Behram H. Bharucha, Bharat T. Doshi, Subrahmanyam Dravida and Sanjiv Nanda, "AAL–2—A New ATM Adaptation Layer for Small Packet Encapsulation and Multiplexing," Bell Labs Technical Journal, pp. 111–131 (Spring 1997).

* cited by examiner

METHOD AND APPARATUS FOR TRANSPORTING PRIVATE LINE TRAFFIC OVER AN ATM NETWORK

CROSS REFERENCE TO RELATED APPLICATIONS

This application claims the benefit of U.S. Provisional Application No. 60/114,394 entitled "Method and Apparatus for Transporting Private Line Traffic Over an ATM Network," filed Dec. 30, 1998.

The present invention is related to U.S. Provisional Patent Application 60/114,378 entitled "Method and Apparatus for Transporting TDM Voice Traffic Over an ATM Network" to Patrick A. Hosein and Gagan L. Choudhury; U.S. Provisional Patent Application 60/114,459 entitled "Method and Apparatus for Removal of Dataless Frames When Transporting Private Line Traffic Over an ATM Network" to Patrick A. Hosein; and U.S. Provisional Patent Application 60/114,458 entitled "Method and Apparatus for Overload and Admission Controls Using the AAL2 Adaptation Layer for TDM Voice and Private Line Traffic" to Patrick A. Hosein, all filed Dec. 30, 1998 and the entire disclosures of which are hereby incorporated by reference.

FIELD OF THE INVENTION

The present invention relates to communication networks. More particularly, the present invention relates to a method and apparatus for transporting private line traffic over an ATM network.

BACKGROUND OF THE INVENTION

Within a telecommunication network, "private line" circuits (TDM lines) may be used to transport information, including voice and/or data traffic. A private line connection between two points may be used, for example, by a business to connect geographically distant offices. The private line connection is reserved, and therefore the network provider can assure a high Quality of Service (QOS) in terms of bandwidth and delay. Although private line traffic may not need such a high QOS, existing customer agreements and equipment often require them. A T-1 circuit is one example of a private line circuit and provides a maximum transmission speed of 1.544 megabits per second (Mb/s).

In order to provide this QOS, private line private line traffic is traditionally transported using a Synchronous Transfer Mode (STM) network. A network using Time Division Multiplexing (TDM) is one example of an STM network. Using TDM, each channel of private line traffic is assigned a specific time period, or TDM channel, configured to let the channel carry a desired maximum rate of data transmission. In this way, the STM network provides a high QOS because each TDM channel, by design, can handle the maximum amount of data information. As a result, data information is generally not lost or delayed. If, however, less than the maximum amount of data information is being sent over a TDM channel, a number of the channel's assigned time periods are not used, and bandwidth is therefore wasted when no data is being transmitted.

It is also known that private line traffic can be transported via an Asynchronous Transfer Mode (ATM) network. An ATM network uses dedicated-connection switching technology that organizes digital data into 53-byte cells and transmits them over a medium using digital signal technology. Individually, a cell is processed asynchronously relative to other related cells and may be queued before being multiplexed with other cells, from other channels, over a single line, or "link." Because ATM networks are more easily implemented by hardware (rather than software), faster processing speeds are possible. In addition, ATM networks allow for more efficient bandwidth use because different services, such as voice and data, can be statistically multiplexed over the same link.

Generally, TDM circuits are transported over an ATM virtual circuit using an ATM Adaptation Layer (AAL). An AAL adaptation layer merely packages higher layer information, such as the T1 or E1 circuit information, into the contents of the 53-byte ATM cell. A number of these virtual circuits are then combined for transport over an ATM network link, such as over a single ATM network "pipe."

To maintain the high quality traditionally associated with STM networks, the AAL1 adaptation layer is used together with Constant Bit Rate (CBR) service (together known as "circuit emulation"). As with TDM, the CBR circuit emulation approach provides a constant guaranteed rate of transfer. That is, a CBR connection allocates a channel enough bandwidth to support the corresponding STM rate. In this way, CBR circuit emulation provides a QOS similar to that of an STM network, but does not provide any statistical multiplexing benefits since cells are still used even when no information is being transported. In other words, with circuit emulation the excess bandwidth that is not used by a customer is not available in the ATM network for other services. This may be a significant amount of unused bandwidth, especially during non-business hours.

In view of the foregoing, it can be appreciated that a substantial need exists for a method and apparatus to transport private line traffic over an ATM network that allows for statistical multiplexing benefits while still maintaining a high QOS.

SUMMARY OF THE INVENTION

The disadvantages of the art are alleviated to a great extent by a method and apparatus for transporting private line traffic over an ATM network. A first plurality of TDM private line traffic links, such as T1 or E1 circuits, are multiplexed to create a first rt-VBR virtual circuit such that the bandwidth of the first rt-VBR virtual circuit is not limited. A second plurality of TDM private line circuits are multiplexed to create a second rt-VBR virtual circuit such that the bandwidth of the second rt-VBR virtual circuit is not limited. This may be done by AAL2 multiplexing with substantially large SCR, PCR and MBS values and the removal of T1 frames that do not contain data (that is, frames that contain "filler" bytes). The first and second rt-VBR virtual circuits are combined for transport over a link in the ATM network. An overload control process may be performed based on the ATM network link utilization.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
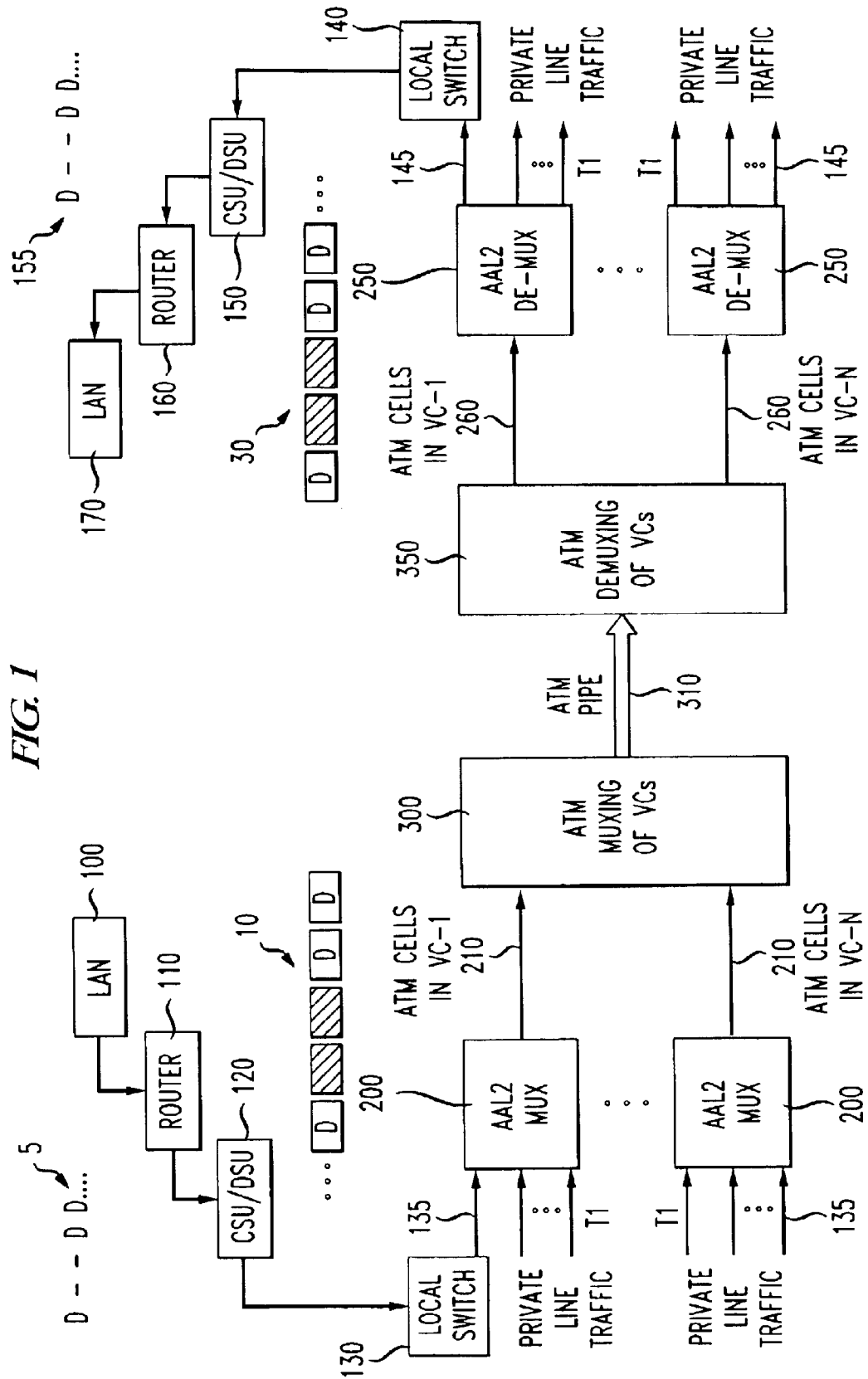
FIG. 1 is a block diagram of a network that transports private line traffic over an ATM link according to an embodiment of the present invention.

The present invention is directed to a method and apparatus for transporting private line traffic over an ATM network. Referring now in detail to the drawings wherein like parts are designated by like reference numerals throughout, there is illustrated in FIG. 1 a block diagram of a network that transports private line traffic over an ATM link according to an embodiment of the present invention. A first communication device 100 transports information over a private line circuit 110, such as a T1 circuit, and a number of T1 circuits 110 are received at an AAL2 multiplexing unit 200. Although an embodiment of the present invention is illustrated using T1 circuits 110, it will be appreciated that other types of circuits, such as international E1 circuits, may be used instead.

The first communication device 100 may receive, for example, asynchronous data 5 which is translated into TDM frames 10 for transport over the T1 circuit 110. The first communication device 100 may insert an idle frame, or filler bytes, into the TDM stream when there is no data to place in a TDM frame. As a result, a number of TDM frames 10, including frames with data (shown with a D) and frames completely without data (shown cross-hatched), are transported.

The T1 circuits 110 are combined at the AAL2 multiplexing unit 200 to create a single rt-VBR virtual circuit 210. As before, SCR, PCR and MBS values for each rt-VBR virtual circuit 210 can be selected such that each virtual circuit 210 can use any bandwidth available at the ATM network pipe 310. That is, the SCR, PCR and MBS values can be made large enough so that cells are rarely discarded for violating these parameters. The parameters may be set once to very large, or even maximum, values and may not need to be re-determined as the system changes, simplifying the provisioning process. A similar approach for voice traffic is described in U.S. Provisional Patent Application 60/114,378 entitled "Method and Apparatus for Transporting TDM Voice Traffic Over an ATM Network" (attorney docket numbers 2685/113404 and CHOUDHURY 4-4).

A number (N) of the rt-VBR virtual circuits 210 are then combined at an ATM multiplexing unit 300 for transport over an ATM network pipe 310 or link. A number of rt-VBR virtual circuits 210 may be required for a high speed ATM pipe because the AAL2 standard allows for a maximum of 248 traffic sources per virtual circuit. Assuming no buffers, a maximum number of private line circuits can then be computed to provide the desired Cell Loss Ratio (CLR). Since the characteristics of the load may change over time, the system may be monitored, in real time, to ensure that the desired CLR is not exceeded.

According to this embodiment of the present invention, TDM frames 10 containing no data (i.e., cells containing only filler bytes) are not included in the cells transported over the ATM pipe 310, leaving only the cells that contain data. This may be done, for example, as described in U.S. Provisional Patent Application 60/114,459 entitled "Method and Apparatus for Removal of Dataless Frames When Transporting Private Line Traffic Over an ATM Network" (attorney docket numbers 2685/113406 and HOSEIN 6).

An ATM de-multiplexing unit 350 separates the single stream received through the ATM pipe 310 and re-creates the N rt-VBR virtual circuits 260. Each of these rt-VBR virtual circuits 260 then pass through an AAL2 de-multiplexing unit 250 which separates the streams, inserting any removed TDM frames, to re-create the T1 circuits 160, one of which is delivered to a second communication device 150. The second communication device 150 thus receives TDM frames 30, including the frames with data and the frames completely without data, that were transported from the first communication device 100. The second communication device 150 can then re-create the original asynchronous data 155.

The detection and removal of "silence" from a TDM voice circuit is well known. According to this embodiment of the present invention, an analogous mechanism may be used for private line traffic as follows. Typically, the first and second communication devices 100, 150 may be, for example, a Frame Relay Assembler/Disassembler (FRAD) or router (not shown in FIG. 1) located at each end of a private line connection. A FRAD is a communications device that breaks a data stream into frames for transmission over a network and re-creates the data stream from incoming frames.

The communication devices 100, 150 may communicate with each other using the High-level Data Link Control (HDLC) transmission protocol, or some variant of the HDLC protocol, which embeds information into frames. According to the HDLC protocol, during periods of no traffic, first communication device 100 continuously transmits a "frame delimiter" octet. Using a T1 circuit as an example, if no data is present for a 125 microsecond ($\mu$sec) period, the corresponding T1 frame will contain 24 frame delimiters. These frame delimiters can be detected and removed at the TDM-to-ATM interface, such as the first AAL2 adaptation layer unit 200. The frame delimiters can be re-inserted at the ATM-to-TDM interface, such as the second AAL2 adaptation layer unit 250.

Figure 2:
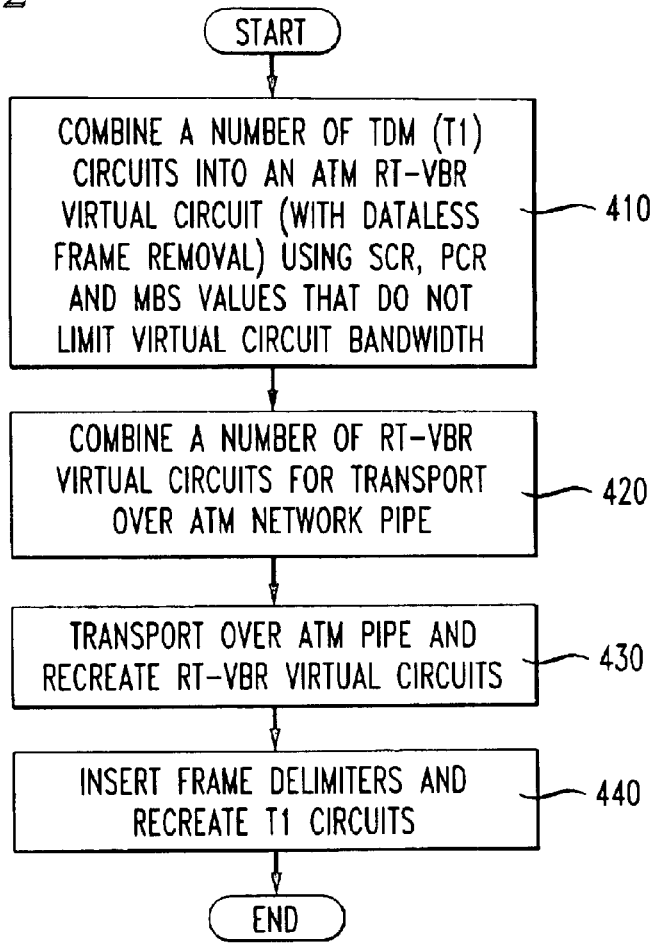
FIG. 2 is a flow diagram of a method for transporting private line traffic over an ATM network according to an embodiment of the present invention.

FIG. 2 is a flow diagram of a method for transporting private line traffic over an ATM network according to an embodiment of the present invention. At step 410, a number of TDM T1 circuits are combined at an AAL2 adaptation layer unit to create a rt-VBR virtual circuit using SCR, PCR and MBS values that do not restrict the bandwidth of the rt-VBR virtual circuit, such as substantially large SCR, PCR and MBS values. A number of these rt-VBR virtual circuits are combined at an ATM multiplexing unit for transport over an ATM network pipe at step 430. At steps 430 and 440 the information is transported over the ATM pipe and the reverse of steps 410 and 420 are performed. That is, the rt-VBR virtual circuits are re-created and used to re-create the T1 circuits.

Because several of these "unlimited" bandwidth rt-VBR virtual circuits are multiplexed onto the ATM pipe 310, statistical multiplexing is achieved at the link level as well as at the AAL2 level. In addition, ATM cells will be rarely queued or dropped, resulting in data quality similar to that obtained using an STM network or circuit emulation. According to an embodiment of the present invention, in doing the AAL2 multiplexing, real time data compression may also be performed.

Moreover, because ATM cells are rarely queued, the rt-VBR virtual circuit buffers will not overflow. Thus, there is no need to invoke overload control based on individual rt-VBR virtual circuits, simplifying congestion management for the system. In other words, each rt-VBR virtual circuit does not need to be policed to ensure that traffic does not exceed the allocated SCR, PCR and MBS values (which can be set to vary large values).

Figure 3:
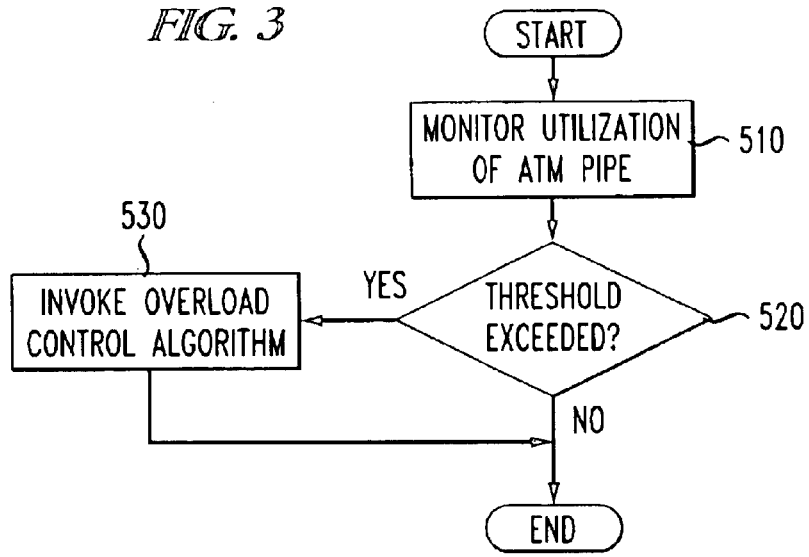
FIG. 3 is a flow diagram of a method for providing overload control when transporting private line traffic over an ATM network according to an embodiment of the present invention.

FIG. 3 is a flow diagram of a method for providing overload control when transporting private line traffic over an ATM network according to an embodiment of the present invention. Details of a suitable method are also disclosed in U.S. Provisional Patent Application 60/114,458 entitled "Method and Apparatus for Overload and Admission Controls Using the AAL2 Adaptation Layer for TDM Voice and Private Line Traffic" (attorney docket numbers 2685/113408 and HOSEIN 7).

Since the overload control in not applied at the rt-VBR circuit level, there will be times when the ATM pipe capacity is not sufficient to serve the offered load. At these times, overload control will be needed and can be applied to all rt-VBR virtual circuits, at all AAL2 multiplexing units, as follows. At step 510, the level of traffic, or "utilization," of the ATM pipe is monitored. When some specific utilization threshold value is exceeded at 520, an overload control algorithm is invoked at 530.

There can be significant advantages to invoking overload control on an ATM pipe basis as opposed to an rt-VBR virtual circuit basis. When done on a virtual circuit basis, the overload control is invoked whenever the load on a single virtual circuit bursts. In contrast, when done on an ATM pipe basis, it is only invoked when the overall load exceeds a threshold value. This implies that a burst caused by a single virtual circuit is easily accommodated by using unused bandwidth from other virtual circuits. Another advantage is the fact that, because overload control is invoked at all virtual circuits simultaneously, a quick relief from the overload is possible. Moreover, the overall link utilization information can be used to determine if the link needs to be re-engineered, such as the addition/deletion of circuits.

Although various embodiments are specifically illustrated and described herein, it will be appreciated that modifications and variations of the present invention are covered by the above teachings and within the purview of the appended claims without departing from the spirit and intended scope of the invention. For example, although particular system architectures were used to illustrate the present invention, it can be appreciated that other architectures may be used instead. Similarly, although particular types of links and channels have been illustrated, other types of links and channels will also fall within the scope of the invention. Finally, although software or hardware are described to control certain functions, such functions can be performed using either software, hardware or a combination of software and hardware, as is well known in the art. As is also known, software may be stored on a medium, such as, for example, a hard or floppy disk or a Compact Disk Read Only Memory (CD-ROM), in the form of instructions adapted to be executed by a processor. The instructions may be stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

What is claimed is:

1. A method for transporting private line traffic, comprising the steps of:

multiplexing a first plurality of Time Division Multiplexing (TDM) private line circuits into a first real time variable bit rate (rt-VBR) virtual circuit such that the bandwidth of the first rt-VBR virtual circuit is not limited and such that a TDM frame without data is not transported over the first rt-VBR virtual circuit;

multiplexing a second plurality of TDM private line circuits into a second rt-VBR virtual circuit such that the bandwidth of the second rt-VBR virtual circuit is not limited and such that a TDM frame without data is not transported over the second rt-VBR virtual circuit;

combining the first and second rt-VBR virtual circuits for transport over a packet network;

monitoring the utilization of the packet network link; and invoking an overload algorithm when the packet network link utilization exceeds a threshold value.

2. A method for transporting private line traffic, comprising the steps of:

multiplexing a first plurality of Time Division Multiplexing (TDM) private line circuits into a first real time variable bit rate (rt-VBR) virtual circuit such that the bandwidth of the first rt-VBR virtual circuit is not limited and such that a TDM frame without data is not transported over the first rt-VBR virtual circuit;

multiplexing a second plurality of TDM private line circuits into a second rt-VBR virtual circuit such that the bandwidth of the second rt-VBR virtual circuit is not limited and such that a TDM frame without data is not transported over the second rt-VBR virtual circuit;

combining the first and second rt-VBR virtual circuits for transport over a packet network; and determining a maximum number of TDM private line circuits to be transported over said packet network by computing the probability that bandwidth requirements of the first and second rt-VBR virtual circuits will result in a cell loss ratio over a predetermined acceptable value.

3. A network for transporting private line traffic over a packet network link, comprising:

a first adaptation layer unit configured to multiplex a first plurality of Time Division Multiplexing (TDM) private line circuits into a first real time variable bit rate (rt-VBR) virtual circuit such that the bandwidth of the first rt-VBR virtual circuit is not limited and such that a TDM frame without data is not transported over the first rt-VBR virtual circuit;

a second adaptation layer unit configured to multiplex a second plurality of TDM private line circuits into a second rt-VBR virtual circuit such that the bandwidth of the second rt-VBR virtual circuit is not limited and such that a TDM frame without data is not transported over the second rt-VBR virtual circuit, wherein said first and second adaptation layer units use sustainable cell rate, peak cell rate and maximum burst size values that do not restrict the bandwidth of said first and second virtual circuits; and a multiplexing unit coupled to said first and second adaptation layer units and configured to combine the first and second rt-VBR virtual circuits for transport over the packet network link.

4. The network of claim 3, further comprising:

a monitoring unit coupled to said multiplexing unit and configured to monitor the utilization of the packet network link;

wherein said first and second adaptation layer units are coupled to said monitoring unit and configured to invoke an overload control algorithm when the packet network link utilization exceeds a first threshold value.

5. A method for transporting private line traffic, comprising the steps of:

multiplexing a first plurality of Time Division Multiplexing (TDM) private line circuits into a first real time variable bit rate (rt-VBR) virtual circuit such that the bandwidth of the first rt-VBR virtual circuit is not limited and such that a TDM frame without data is not transported over the first rt-VBR virtual circuit;

multiplexing a second plurality of TDM private line circuits into a second rt-VBR virtual circuit such that the bandwidth of the second rt-VBR virtual circuit is not limited and such that a TDM frame without data is not transported over the second rt-VBR virtual circuit; and combining the first and second rt-VBR virtual circuits for transport over a packet network link;

wherein said steps of multiplexing use sustainable cell rate, peak cell rate and maximum burst size values that that do not restrict the bandwidth of said first and second virtual circuits.

\* \* \* \* \*